US012812178B2

(12) United States Patent
Xu et al.

(10) Patent No.: US 12,812,178 B2
(45) **Date of Patent: *Nov. 24, 2026**

(54) NON-TRANSFORM CODING

(71) Applicant: Microsoft Technology Licensing, LLC, Redmond, WA (US)

(72) Inventors: Jizheng Xu, Beijing (CN); Cuiling Lan, Xi'an (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,073

(22) Filed: Jan. 15, 2025

(65) Prior Publication Data

US 2025/0159261 A1 May 15, 2025

Related U.S. Application Data

(63) Continuation of application No. 18/231,963, filed on Aug. 9, 2023, now Pat. No. 12,256,104, which is a (Continued)

(51) Int. Cl.

| | |
|---|---|
| ***H04N 19/00*** | (2014.01) |
| ***H04N 19/12*** | (2014.01) |
| ***H04N 19/13*** | (2014.01) |
| ***H04N 19/14*** | (2014.01) |
| ***H04N 19/147*** | (2014.01) |
| ***H04N 19/172*** | (2014.01) |
| ***H04N 19/176*** | (2014.01) |
| ***H04N 19/645*** | (2014.01) |
| *H04N 21/845* | (2011.01) |

(52) U.S. Cl.

CPC ........... *H04N 19/645* (2014.11); *H04N 19/12* (2014.11); *H04N 19/13* (2014.11); *H04N 19/14* (2014.11); *H04N 19/147* (2014.11); *H04N 19/172* (2014.11); *H04N 19/176* (2014.11); *H04N 21/8451* (2013.01)

(58) Field of Classification Search

None

See application file for complete search history.

(56) References Cited

U.S. PATENT DOCUMENTS

| | | | | |
|---|---|---|---|---|
| 5,410,350 A * | 4/1995 | Kato | ...................... | H04N 19/98<br>375/E7.223 |
| 5,751,359 A * | 5/1998 | Suzuki | .................. | H04N 19/40<br>375/E7.184 |

(Continued)

OTHER PUBLICATIONS

Lan et al. "Compress Compound Images in H.264/MPGE-4 AVC by Exploiting Spatial Correlation". (Year: 2010).*

(Continued)

*Primary Examiner* — Zhihan Zhou

(74) *Attorney, Agent, or Firm* — Klarquist Sparkman, LLP

(57) ABSTRACT

Techniques for selectively transforming one or more coding units when coding video content are described herein. The techniques may include determining whether or not to transform a particular coding unit. The determination may be based on a difference in pixel values of the particular coding unit and/or one or more predefined rate-distortion constraints. When it is determined to not perform a transform, the particular coding unit may be coded without transforming the particular coding unit.

20 Claims, 4 Drawing Sheets

Related U.S. Application Data continuation of application No. 17/886,923, filed on Aug. 12, 2022, now Pat. No. 11,765,390, which is a continuation of application No. 17/230,246, filed on Apr. 14, 2021, now Pat. No. 11,451,827, which is a continuation of application No. 16/821,786, filed on Mar. 17, 2020, now Pat. No. 11,006,149, which is a continuation of application No. 16/379,575, filed on Apr. 9, 2019, now Pat. No. 10,623,776, which is a continuation of application No. 15/839,575, filed on Dec. 12, 2017, now Pat. No. 10,298,955, which is a continuation of application No. 15/624,824, filed on Jun. 16, 2017, now Pat. No. 9,866,868, which is a continuation of application No. 15/582,193, filed on Apr. 28, 2017, now Pat. No. 9,866,867, which is a continuation of application No. 13/593,214, filed on Aug. 23, 2012, now abandoned.

(56) References Cited

U.S. PATENT DOCUMENTS 8,442,311 B1* 5/2013 Hobbs ........................ G06T 9/00 382/166
2009/0016626 A1* 1/2009 Zhang .................. H04N 19/625 382/238
2011/0090960 A1* 4/2011 Leontaris ............. H04N 19/194 375/240.18
2011/0310976 A1* 12/2011 Wang ..................... H04N 19/61 375/E7.176
2012/0008683 A1* 1/2012 Karczewicz ........... H04N 19/46 375/E7.243
2013/0003838 A1* 1/2013 Gao ....................... H04N 19/46 375/240.18
2013/0077696 A1* 3/2013 Zhou .................... H04N 19/167 375/E7.026
2013/0142248 A1* 6/2013 Cook ................... H04N 19/649 375/240.18

OTHER PUBLICATIONS

Office Action dated Mar. 23, 2026, from U.S. Appl. No. 19/023,011, 12 pp.
Office Action dated Mar. 26, 2026, from U.S. Appl. No. 19/023,035, 12 pp.
Office Action dated Apr. 2, 2026, from U.S. Appl. No. 19/023,054, 11 pp.
Notice of Allowance dated Aug. 14, 2026, from U.S. Appl. No. 19/023,011, 7 pp.
Notice of Allowance dated Aug. 14, 2026, from U.S. Appl. No. 19/023,035, 7 pp.
Notice of Allowance dated Aug. 14, 2026, from U.S. Appl. No. 19/023,054, 7 pp.

* cited by examiner

NON-TRANSFORM CODING

CROSS REFERENCE TO RELATED APPLICATIONS

This application is a continuation of U.S. patent application Ser. No. 18/231,963, filed Aug. 9, 2023, which is a continuation of U.S. patent application Ser. No. 17/886,923, filed Aug. 12, 2022, now U.S. Pat. No. 11,765,390, which is a continuation of U.S. patent application Ser. No. 17/230,246, filed Apr. 14, 2021, now U.S. Pat. No. 11,451,827, which is a continuation of U.S. patent application Ser. No. 16/821,786, filed Mar. 17, 2020, now U.S. Pat. No. 11,006,149, which is a continuation of U.S. patent application Ser. No. 16/379,575, filed Apr. 9, 2019, now U.S. Pat. No. 10,623,776, which is a continuation of U.S. patent application Ser. No. 15/839,575, filed Dec. 12, 2017, now U.S. Pat. No. 10,298,955, which is a continuation of U.S. patent application Ser. No. 15/624,824, filed Jun. 16, 2017, now U.S. Pat. No. 9,866,868, which is a continuation of U.S. patent application Ser. No. 15/582,193, filed Apr. 28, 2017, now U.S. Pat. No. 9,866,867, which is a continuation of U.S. patent application Ser. No. 13/593,214, filed Aug. 23, 2012, the disclosure of which is hereby incorporated by reference.

BACKGROUND

The delivery of video content generally offers a rich user experience. To promote efficient delivery, the video content is typically encoded prior to delivery to reduce the amount of data transferred over the network. One common type of video compression is a motion-compensation-based video coding scheme, which is used in such coding standards as MPEG-1, MPEG-2, MPEG-4, H.261, H.263, and H.264/AVC. In such coding standards, video images are sampled and transformed into coefficients that capture the variation in pixels across the image. The coefficients are then quantized and sent to a decoder. The decoder is able to decode the image by performing operations that are substantially the inverse of the encoding operation.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

This disclosure is directed to coding video content by selectively transforming one or more units associated with the video content. In particular implementations, an encoder may perform various coding operations to encode a unit of a video frame (e.g., block of pixels). During encoding, the encoder may determine whether or not to transform the unit. For example, the encoder may determine to not transform the unit when a difference between the highest pixel values and the lowest pixel values of the unit is above a predetermined value or when one or more predefined rate-distortion constraints are satisfied (e.g., the rate-distortion cost of not transforming the unit is smaller than that of transforming the unit).

When it is determined to transform the unit, the encoder may transform residual information associated with the unit to form coefficients and quantize the coefficients. The residual information may have been generated through one or more prediction performed on the unit. However, when it is determined to not transform the unit, the encoder may quantize the residual information without transforming the residual information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
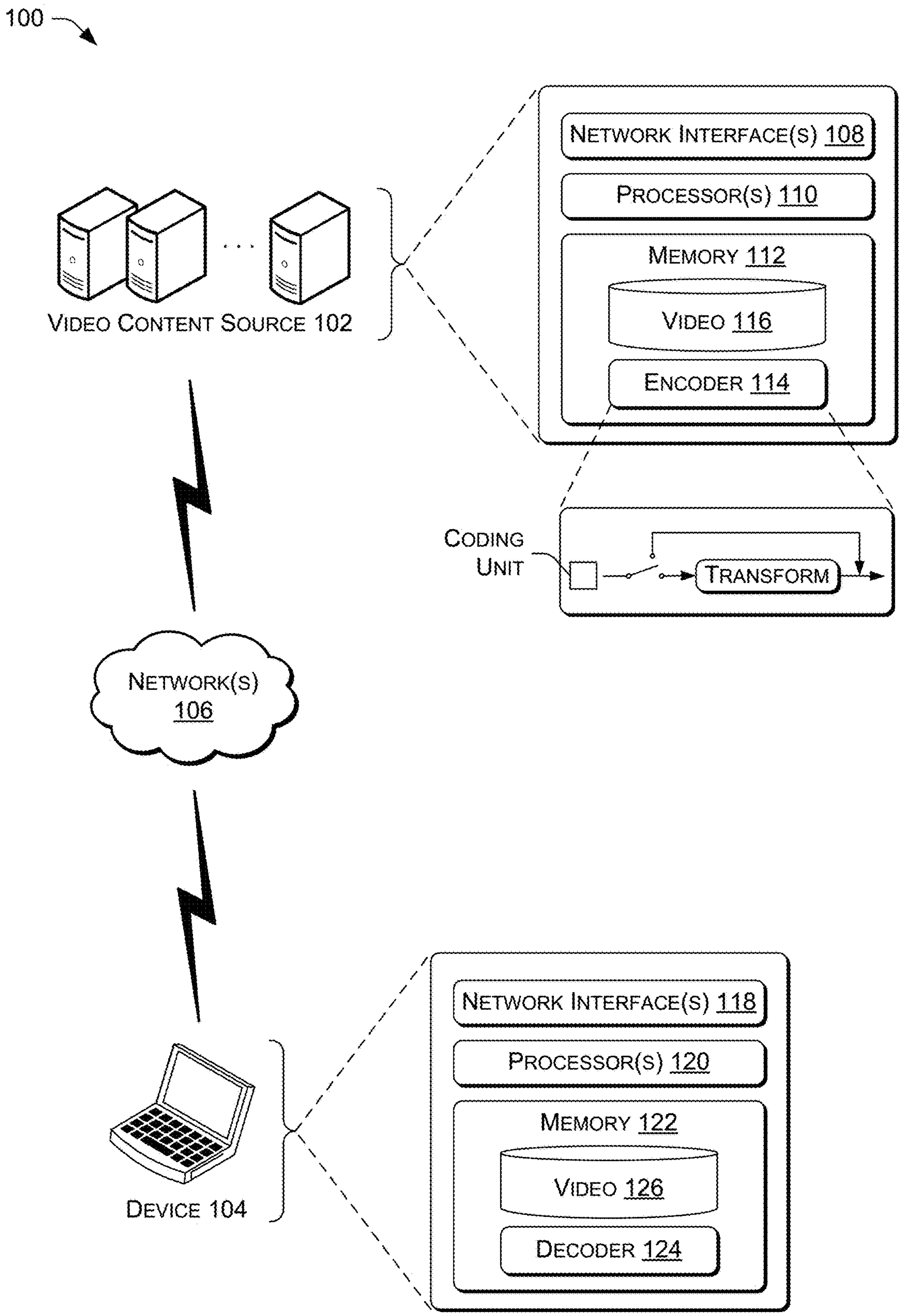
FIG. 1 illustrates an example architecture to code video content by selectively transforming one or more units associated with the video content.

Video content is generally defined by a series of frames that are associated with a particular order. These frames often include duplicative information in a single frame or across multiple frames. In order to reduce an amount of duplicative information that is stored or transferred, an encoder may perform various coding (e.g., compression) techniques that decrease a number of bits used to represent the video content. However, in some instances a coding technique may provide undesired results. For example, when a unit associated with textual content is transformed, there may be many large coefficients and some information associated with the unit may be removed after quantization, resulting in blurry textual content when the unit is decoded.

This disclosure is directed to coding video content by selectively transforming one or more units associated with the video content. That is, in some instances a particular unit may be coded through prediction, quantization, and/or entropy coding without transforming the particular unit. This may allow the particular unit to be coded without losing information associated with transforming the unit.

In particular implementations, an encoder may utilize a unit (e.g., coding unit) to code a block of pixels of a video frame. The unit may be defined by a particular standard, such as the High Efficiency Video Coding (HEVC) standard, Advanced Video Coding (AVC) standard, and so on. During coding, the encoder may determine whether or not to transform the coding unit. For example, the encoder or decoder may determine to not transform the unit when a difference between the highest pixel values and the lowest pixel values of the unit is above a predetermined value or when one or more predefined rate-distortion constraints are satisfied.

When it is determined to transform the unit, the encoder may transform residual information associated with the unit to form coefficients. The coefficients may then be quantized. The residual information may have been generated through prediction performed on the unit. However, when it is determined to not transform the unit, the encoder or decoder may quantize the residual information without transforming the residual information.

In either case, entropy coding may be performed on the quantized information (e.g., quantized residual information or quantized coefficients). If the unit was not transformed, then the entropy coding may utilize quantized information for previous units which were not transformed (e.g., units in a same frame that were previously coded). Alternatively, if the unit was transformed, then the entropy coding may utilize quantized information for previous units that were transformed.

While the coding techniques are described herein in the context of the High Efficiency Video Coding (HEVC) standard, these techniques may similarly apply to other standards, such as the Advanced Video Coding (AVC) standard, and so on.

In some instances, the coding techniques described herein may allow video content to be coded without losing information associated with performing a transform. For example, by refraining from performing a transform on a particular unit, information that is typically lost during a transform may be maintained.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. Here, the techniques are described in the context of a video content source 102 that encodes (e.g., compresses) video content and sends the encoded video content to a device 104. The video content source 102 communicates with the device 104 over a network(s) 106.

The video content source 102 and/or the device 104 may be implemented by any of a variety of conventional computing devices, such as a server, a laptop computer, a desktop computer, a smart phone, an electronic reader device, a mobile handset, a personal digital assistant (PDA), a portable navigation device, a portable gaming device, a tablet computer, a watch, a portable media player, and the like. In one example, the video content source 102 and/or the device 104 is configured in a cluster, data center, cloud computing environment, or a combination thereof.

The video content source 102 is equipped with one or more network interfaces 108, one or more processors 110, and memory 112. The memory 112 may be configured to store one or more software and/or firmware modules, which are executable on the one or more processors 110 to implement various functions. For example, the memory 112 may include an encoder 114 (e.g., encoder module) configured to encode video content 116. Although not illustrated in FIG. 1, the memory 112 may also include a decoder configured to decode video content.

The encoder 114 may perform encoding operations to compress video content. For example, the encoder 114 may divide a video frame into multiple coding units. Each coding unit may correspond to a block of pixels having predetermined pixel dimensions (e.g., 8×8, 16×16, 32×32, 64×64, etc.). The encoder 114 may then apply prediction, transform, quantization, and/or entropy coding to a coding unit in order to generate a bitstream. As described herein, a transform may be selectively performed based on whether or not one or more criteria are satisfied. For example, the encoder 114 may determine to not transform the coding unit when a difference between the highest pixel values and the lowest pixel values of the unit is above a predetermined value or when one or more predefined rate-distortion constraints are satisfied. In some instances, the bitstream may include a flag (e.g., one or more bits) to indicate whether or not the coding unit was transformed.

The device 104 is equipped with one or more network interfaces 118, one or more processors 120, and memory 122. The memory 122 may be configured to store one or more software and/or firmware modules, which are executable on the one or more processors 120 to implement various functions. For example, the memory 122 may include a decoder 124 (e.g., decoder module) configured to decode video content 126. The video content 126 may have been received from the video content source 102 or may have been received from a different source. Although not illustrated in FIG. 1, the memory 122 may also include an encoder configured to encode video content.

The decoder 124 may perform decoding operations to decompress video content. In particular, the decoder 124 may receive a bitstream from the encoder 114 and perform operations that are substantially the inverse of the encoding operations. The decoder 124 may selectively perform an inverse transform on a coding unit based on whether or not the coding unit was transformed. In some instances, the decoder 124 may reference a flag included in the bitstream to determine whether or not a coding unit was transformed.

The coding techniques are generally described herein as being performed on a coding unit. In some instances, this includes representing a coding unit as one or more prediction or transform units as the coding unit is coded. That is, when prediction is performed, the coding unit may be represented as one or more prediction units (PUs), and when a transform is performed, the coding unit may be represented by one or more transform units (TUs). A transform unit may have predetermined pixel dimensions (e.g., 2×8, 8×2, 4×16, 16×4, 8×32, 32×8, etc.). As such, in some instances a coding unit may be split into sub-units and coding operations may be performed on the sub-units individually (e.g., a transform may be selectively performed on a transform unit that corresponds to a sub-unit of the coding unit). To illustrate, a transform may be performed on a first transform unit and a transform may not be performed on a second transform unit, where the first and second transform units are sub-units of a coding unit.

Further, in some instances the coding techniques described herein are performed to transform units at a lowest level (e.g., leaf transform units). As noted above, a coding unit may be divided into transform units, and each transform unit may be divided into sub-units. In some instances, the techniques described herein are performed only to transform units which are not split, "leaf transform units."

Although the encoder 114 and decoder 124 are illustrated in FIG. 1 as being implemented as modules, the encoder 114 and/or decoder 124 may be implemented as one or more microprocessors, digital signal processors, application specific integrated circuits (ASICs), field programmable gate arrays (FPGAs), discrete logic, or any combinations thereof. In some instances, the encoder 114 and/or decoder 124 may be integrated with an audio encoder/decoder and include appropriate MUX-DEMUX units, or other hardware and software, to handle encoding/decoding of both audio and video in a common data stream or separate data streams. In addition, in some instances the encoder 114 and/or decoder

124 may be constructed as part of a processor or incorporated into an operating system or other application. Further, the encoder 114 and/or decoder 124 may operate according to a video compression standard, such as MPEG-1, MPEG-2, MPEG-4, H.261, H.263, H.264/AVC, and HEVC.

Although the memory 112 and 122 is depicted in FIG. 1 as a single unit, the memory 112 and/or 122 (and all other memory described herein) may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

As noted above, the video content source 102 and the device 104 may communicate via the network(s) 106. The network(s) 106 may include any one or combination of multiple different types of networks, such as cellular networks, wireless networks, Local Area Networks (LANs), Wide Area Networks (WANs), and the Internet.

Example Encoder

Figure 2:
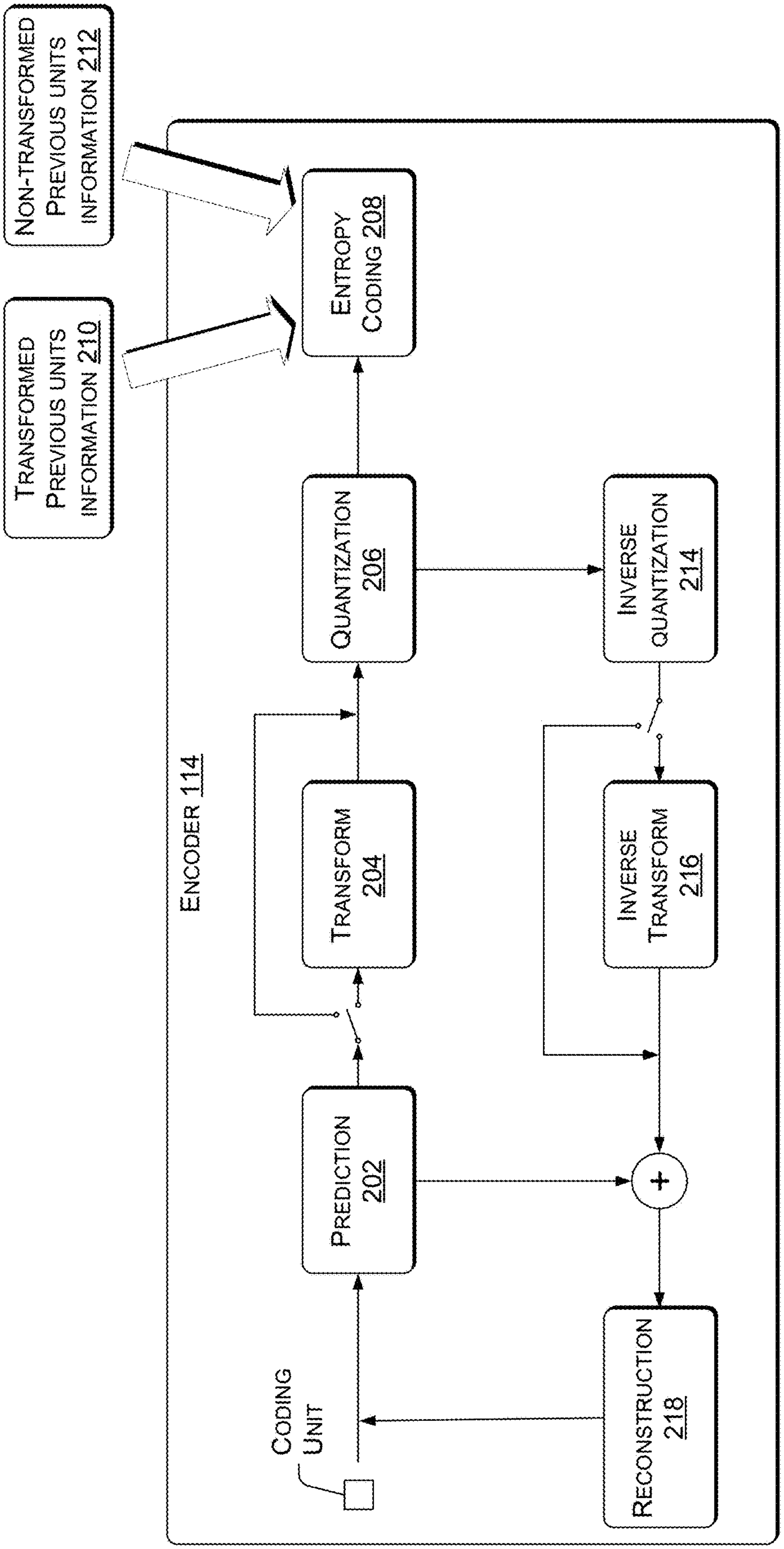
FIG. 2 illustrates example details of the encoder of FIG. 1.

FIG. 2 illustrates example details of the encoder 114 of FIG. 1. In particular the encoder 114 includes a prediction block 202 (e.g., module, hardware, etc.) to perform prediction on a coding unit. The prediction block 202 may perform intra-frame (e.g., spatial) or inter-frame (e.g., temporal) prediction on the coding unit. In intra-frame prediction, the prediction block 202 may determine a reference block in a same frame as the coding unit that best matches the coding unit (e.g., best match in pixel values). In inter-frame prediction, the prediction block 202 may determine a reference block in a temporally neighboring frame to the frame of the coding unit that best matches the coding unit. In either case, when the reference block does not exactly match the coding unit, the prediction block 202 may determine a difference between pixel values of the reference block and the coding unit. This difference is referred to as "residual information" (also known as "residue" or "residual values").

The encoder 114 may also include a transform block 204 that is selectively applied to a coding unit (e.g., residual information of the coding unit). That is, in some instances the transform block 204 is applied while in other instances the transform block 204 is not applied. In either case, the encoder 114 may utilize a flag to control application of the transform block 204. The flag may be stored as one or more bits in a bitstream with a coding unit so that the decoder 124 may determine whether or not the coding unit was transformed.

In one example, the encoder 114 does not apply the transform block 204 when a difference between the highest pixel values and the lowest pixel values of a coding unit is above a predetermined value. To illustrate, if most of the pixel values (e.g., more than a predetermined percentage) are either "0" or "255," such as in the case of textual content or black and white content, then there may be a relatively large difference between pixel values of the coding unit. Here, the coding unit may include image content having relatively "sharp edges" (e.g., large change between pixel values). In such instances, a transform may be undesirable as it would average the pixel values and remove the "sharp edges" of the image content after quantization. Accordingly, the transform block 204 may not be applied in these instances.

Alternatively, or additionally, the encoder 114 may not apply the transform block 204 when one or more predefined rate-distortion constraints are satisfied (e.g., the rate-distortion cost of not transforming the unit is smaller than that of transforming the unit). For example, the encoder 114 may specify that a particular amount of distortion is allowed for a particular amount of data (e.g., bits) used to encode the coding unit. The encoder 114 may determine to not apply the transform block 204 to a coding unit if the coding unit can be encoded without a transform and satisfy a predefined rate-distortion constraint (e.g., less than a predetermined amount of distortion at, or less than, a predetermined amount of data). The encoder 114 may also apply the transform block 204 based on generally known cost strategies, such as a number of non-zero quantized coefficients (generally a small coefficient number means high efficiency for a transform because the energy is compacted by the transform). For example, the encoder 114 may not apply the transform block 204 when a coding unit would be associated with more than a predetermined number of non-zero quantized coefficients if the coding unit were transformed and quantized.

The transform block 204 may utilize a discrete cosine transform (DCT), discrete wavelet transform, or any other generally known technique to transform the residual information associated with the coding unit. The transform block 204 may output a set of coefficients that correspond to the residual information.

The encoder 114 may also include a quantization block 206 to quantize a coding unit. In instances where the coding unit was transformed, the coefficients of the coding unit from the transform block 204 may be quantized. In instances where the coding unit was not transformed, the residual information of the coding unit from the prediction block 202 may be quantized.

The encoder 114 may also include an entropy coding block 208 to entropy code the quantized information (e.g., quantized residual information or quantized coefficients). In some instances, the entropy coding includes performing context-based adaptive binary arithmetic coding (CABAC), although other techniques may similarly be used, such as context-based adaptive variable-length coding (CAVLC). The entropy coding may utilize flags (e.g., indicating whether or not a transform was applied) associated with reconstructed blocks of a same frame that are to the left and/or above the coding unit for which entropy coding is being applied. The entropy coding may generate a bitstream that represents, at least in part, video content. The bitstream may include a flag for each coding unit to indicate whether or not the coding unit was transformed during encoding.

The entropy coding block 208 may utilize quantized information for previous coding unit to entropy code a particular coding unit. The previous coding units may be coding units within a same frame as the particular coding unit that have been previously coded. In some embodiments, the entropy coding block 208 may utilize different types of information to entropy code the particular coding unit based on whether or not the transform block 204 was applied to the particular coding unit. For example, when a transform was performed on the particular coding unit, the entropy coding block 208 may utilize information 210 (e.g., quantized coefficients) associated with previous coding units for which the transform block 204 was applied. When a transform was not performed on the particular coding unit, the entropy coding block 208 may utilize information 212 (e.g., quantized residual information) associated with previous coding units for which the transform block 204 was not applied. However, it should be appreciated that the entropy coding block 208 may utilize combined information from any of the previous coding units in some instances.

Meanwhile, an inverse quantization block 214 may also be included in the encoder 114 to perform an inverse quantization of a coding unit that is currently be encoded. Thereafter, an inverse transform block 216 may be selectively applied to the coding unit. If the transform block 204 was applied, then the inverse transform block 216 may perform an inverse transform of the coding unit, and if the transform block 204 was not applied, then the inverse transform block 216 would not be applied. In either case, the coding unit may be reconstructed at reconstruction block 218 based on information from the prediction block 202. This information may indicate a reference block utilized to form the residual information for the coding unit. The reconstructed coding unit may be used to encode another coding unit, such as another coding unit in a same frame as the coding unit.

In some instances, a de-blocking filter may be applied during coding (e.g., encoding and/or decoding), which may generally smooth edges between boundaries of coding units. If, at the encoder 114, a transform was not applied to the coding unit, then the encoder 114 may refrain from applying a de-blocking filter to the coding unit. Similarly, the decoder 124 may refrain from applying a de-blocking filter if a transform was not applied to the coding unit.

Example Processes

Figure 3:
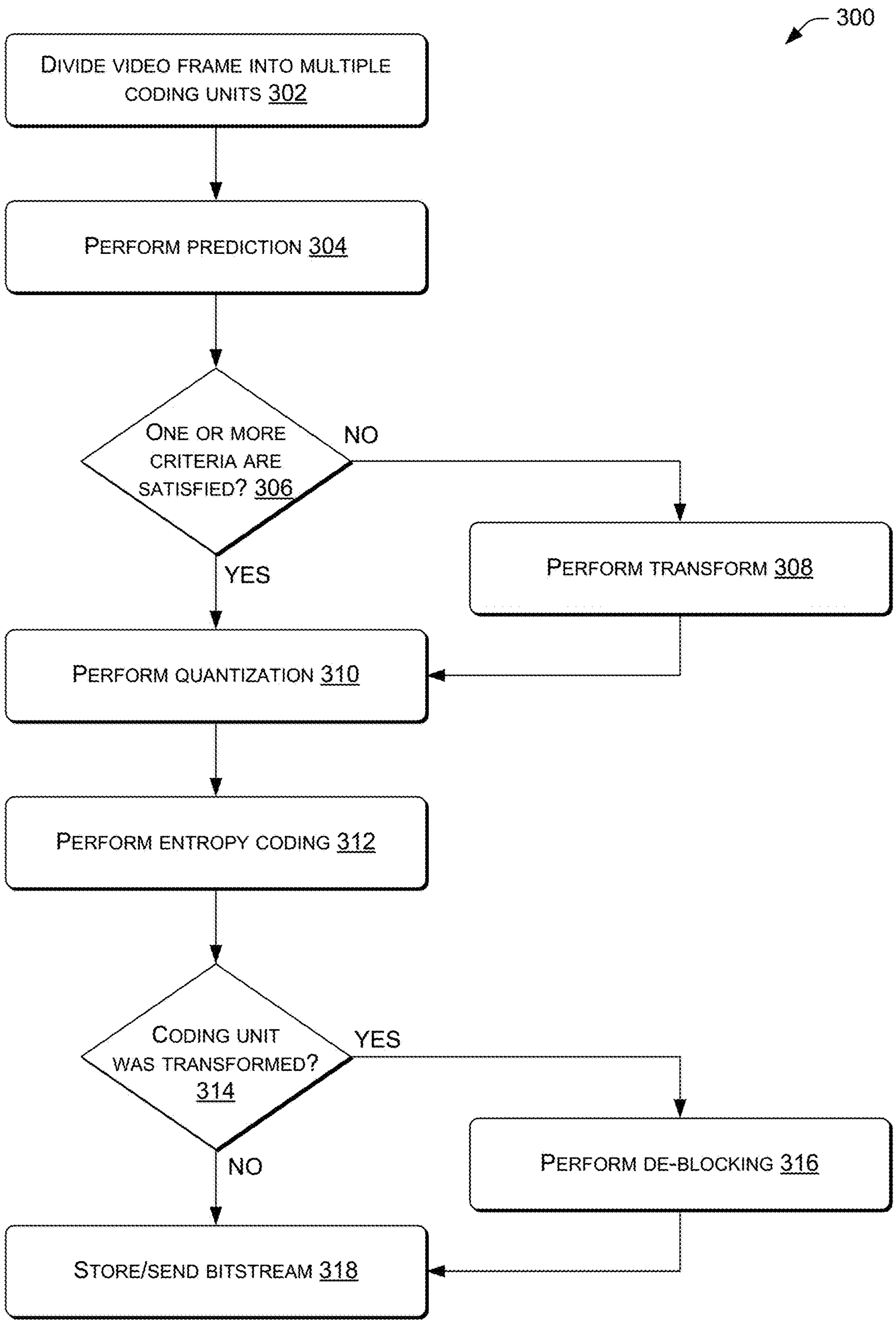
FIG. 3 illustrates an example process that may be performed by an encoder to determine whether or not to apply a transform while encoding a unit of a video frame and to encode the unit based on the determination.
Figure 4:
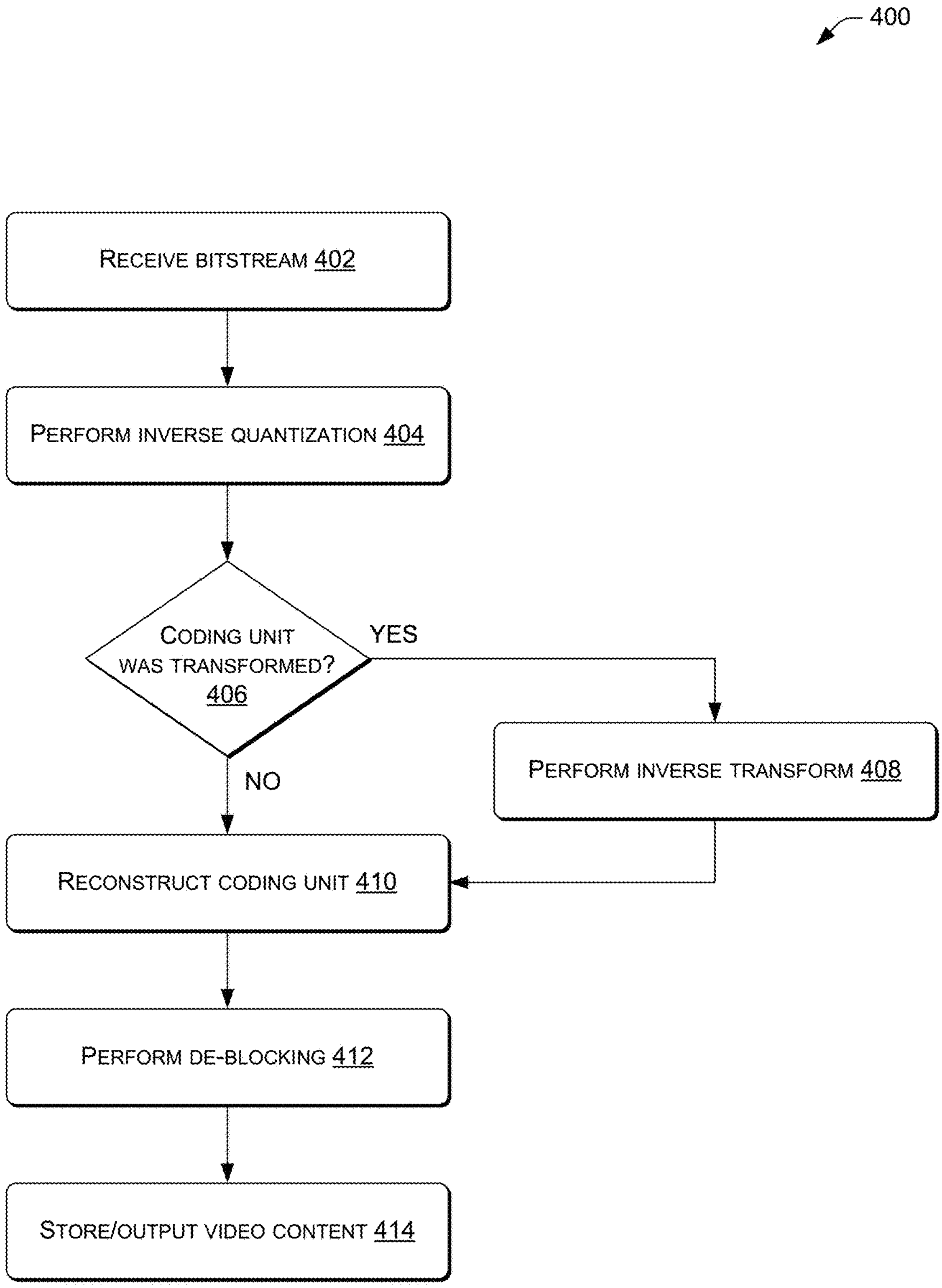
FIG. 4 illustrates an example process that may be performed by a decoder to determine whether or not to apply an inverse transform while decoding a unit of a video frame and to decode the unit based on the determination.

FIGS. 3-4 illustrate example processes 300 and 400 for employing the techniques described herein. For ease of illustration processes 300 and 400 are described as being performed in the architecture 100 of FIG. 1. For example, one or more of the individual operations of the process 300 may be performed by the encoder 114, while one or more of the operations of the process 400 may be performed by the decoder 124. However, processes 300 and 400 may be performed in other architectures. Moreover, the architecture 100 may be used to perform other processes.

The processes 300 and 400 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In FIG. 3, at 302, the encoder 114 may divide a video frame into multiple coding units. Each coding unit may be divided into one or more prediction and/or transform units, and each prediction or transform unit may be divided into sub-units. For ease of illustration, the process 300 is described as being performed on a coding unit. However, it should be appreciated that the process 300 may be performed on a transform unit, and in some instances, on those transform units which are not divided into sub-units (e.g., leaf transform units).

At 304, the encoder 114 may perform prediction on the coding unit to generate residual information. In some instances, the encoder 114 performs intra-frame prediction, while in other instances inter-frame prediction may be performed.

At 306, the encoder 114 may determine whether or not one or more criteria are satisfied. The one or more criteria may be satisfied when a difference between the highest pixel values and the lowest pixel values of the coding unit is above a predetermined value or when one or more predefined rate-distortion constraints are satisfied. Although the determination of the operation 306 is illustrated as being performed after the operation 304, in some instances the determination of the operation 306 is performed earlier in the process 300, such as after the operation 302. When the one or more criteria are not satisfied at 306, the process 300 may proceed to 308. Alternatively, when the one or more criteria are satisfied, the process 300 may proceed directly to 310.

At 308, the encoder 114 may transform the coding unit. That is, the encoder 114 may transform the residual information generated at the operation 304 to form coefficients. The transform may include any generally known transform, such as DCT, and so on.

At 310, the encoder 114 may perform quantization on the coding unit. That is, the encoder 114 may quantize the residual information from the operation 304 or the coefficients from the operation 308.

At 312, the encoder 114 may perform entropy coding on the coding unit (e.g., quantized residual information or quantized coefficients). In instances where the coding unit was transformed, the entropy coding may utilize information associated with previous coding units which were transformed. In instances where the coding unit was not transformed, the entropy coding may utilize information associated with previous coding units which were not transformed. The entropy coding may result in generation of a bitstream.

At 314, the encoder 114 may determine whether or not the coding unit was transformed. When the coding unit was transformed, at 316 the encoder 114 may perform deblocking on the coding unit. When the coding unit was not transformed, the process 300 may proceed directly to 318. At 318, the encoder 114 may store the bitstream locally and/or send the bitstream to the decoder 124.

In FIG. 4, at 402, the decoder 124 may receive a bitstream from the encoder 114. The bitstream may represent video content and may include a flag for each coding unit indicating whether or not the coding unit was transformed.

At 404, the decoder 124 may perform inverse quantization on a coding unit resulting in residual information or coefficients. This may include performing an operation that is substantially an inverse of the operation performed at 310 of FIG. 3.

At 406, the decoder 124 may determine whether or not the coding unit was transformed. If the coding unit was transformed, at 408 the decoder 124 may perform an inverse transform on the coding unit resulting in residual information. This may include performing an operation that is substantially an inverse of the operation performed at 308 of FIG. 3. If the coding unit was not transformed, the process 400 may proceed directly to an operation 410. At 410, the decoder 124 may reconstruct the coding unit with the residual information. This may include utilizing intra-frame or inter-frame prediction.

At 412, the decoder 124 may perform de-blocking based on the determination at 406. That is, if the coding unit was transformed, then the de-blocking may be performed to smooth boundaries of the coding unit with other coding units. However, if the coding unit was not transformed, then the de-blocking may not be performed.

At 414, the decoder 124 may store the video content and/or output the video content to a device (e.g., display device).

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computer system comprising one or more processing units and memory, wherein the computer system implements a video encoder configured to perform operations comprising:

determining intra prediction values for a current block of pixel values;

based at least in part on the intra prediction values, determining intra prediction residual information for the current block;

selectively performing a transform on the intra prediction residual information for the current block, thereby producing residual values for the current block;

quantizing the residual values for the current block;

entropy coding the quantized residual values for the current block using context-based binary arithmetic coding, including using different information in the entropy coding the quantized residual values for the current block depending on whether or not the transform has been performed on the intra prediction residual information for the current block;

setting a flag, the flag at least in part indicating whether or not an inverse transform is to be used during decoding for the intra prediction residual information for the current block, wherein the inverse transform is to be skipped if the flag indicates the inverse transform is not to be used during the decoding for the intra prediction residual information for the current block; and outputting the flag and the entropy-coded quantized residual values for the current block.

2. The computer system of claim 1, wherein:

if the transform has been performed on the intra prediction residual information for the current block, the different information is information associated with previous blocks for which transforms were performed; and otherwise, the transform not having been performed on the intra prediction residual information for the current block, the different information is information associated with previous blocks for which transforms were not performed.

3. The computer system of claim 1, wherein the different information is different context for the entropy coding the quantized residual values for the current block.

4. The computer system of claim 1, wherein the flag is entropy coded using context-based adaptive binary arithmetic coding.

5. The computer system of claim 1, wherein the flag is entropy coded utilizing a flag for a block to the left of the current block and a flag for a block above the current block.

6. The computer system of claim 1, wherein the residual values are transform coefficients or the intra prediction residual information depending on whether the transform is performed for the current block, the residual values being the transform coefficients if the transform is performed for the current block, and the residual values being the intra prediction residual information if the transform is not performed for the current block.

7. The computer system of claim 1, wherein the intra prediction residual information for the current block is for a transform unit of a coding unit.

8. In a computer system that implements a video decoder, a method comprising:

receiving a flag and entropy-coded quantized residual values for a current block of pixel values;

referencing the flag, the flag at least in part indicating whether or not an inverse transform is used during decoding for intra prediction residual information for the current block;

entropy decoding the entropy-coded quantized residual values for the current block, the entropy-coded quantized residual values for the current block having been entropy coded using context-based binary arithmetic coding in which different information has been used in entropy coding quantized residual values for the current block depending on whether or not a transform has been performed on the intra prediction residual information for the current block;

inverse quantizing the quantized residual values for the current block;

selectively performing an inverse transform on the inverse quantized residual values for the current block, thereby producing the intra prediction residual information, wherein the inverse transform is skipped if the flag indicates the inverse transform is not used during the decoding for the intra prediction residual information for the current block;

determining intra prediction values for the current block; and combining the intra prediction residual information and the intra prediction values for the current block.

9. The method of claim 8, wherein:

if the transform has been performed on the intra prediction residual information for the current block, the different information is information associated with previous blocks for which transforms were performed; and otherwise, the transform not having been performed on the intra prediction residual information for the current block, the different information is information associated with previous blocks for which transforms were not performed.

10. The method of claim 8, wherein the different information is different context for the entropy coding the quantized residual values for the current block.

11. The method of claim 8, wherein the flag has been entropy coded using context-based adaptive binary arithmetic coding.

12. The method of claim 8, wherein the flag has been entropy coded utilizing a flag for a block to the left of the current block and a flag for a block above the current block.

13. The method of claim 8, wherein the residual values are transform coefficients or the intra prediction residual information depending on whether the inverse transform is performed for the current block, the residual values being the transform coefficients if the inverse transform is performed for the current block, and the residual values being the intra prediction residual information if the inverse transform is not performed for the current block.

14. The method of claim 8, wherein the intra prediction residual information for the current block is for a transform unit of a coding unit.

15. One or more non-transitory computer-readable media having programmed thereon a flag in encoded data, the flag at least in part indicating whether or not an inverse transform is used during decoding for intra prediction residual information for a current block of pixel values, wherein the encoded data further includes entropy-coded quantized residual values for the current block, the encoded data being usable to cause a video decoder, when processing the encoded data in a computer system having one or more processing units and memory, to perform operations that include:

based at least in part on the entropy-coded quantized residual values for the current block, entropy decoding quantized residual values for the current block, the quantized residual values having been entropy coded using context-based binary arithmetic coding in which different information has been used in entropy coding the quantized residual values for the current block depending on whether or not a transform has been performed on the intra prediction residual information for the current block;

inverse quantizing the quantized residual values for the current block;

based at least in part on the flag, selectively performing an inverse transform on the inverse quantized residual values for the current block, thereby producing the intra prediction residual information for the current block, wherein the inverse transform is skipped if the flag indicates the inverse transform is not used during the decoding for the intra prediction residual information for the current block;

determining intra prediction values for the current block; and combining the intra prediction residual information for the current block and the intra prediction values for the current block.

16. The one or more non-transitory computer-readable media of claim 15, wherein the flag has been entropy coded using context-based adaptive binary arithmetic coding.

17. The one or more non-transitory computer-readable media of claim 15, wherein the flag has been entropy coded utilizing a flag for a block to the left of the current block and a flag for a block above the current block.

18. The one or more non-transitory computer-readable media of claim 15, wherein:

if the transform has been performed on the intra prediction residual information for the current block, the different information is information associated with previous blocks for which transforms were performed; and otherwise, the transform not having been performed on the intra prediction residual information for the current block, the different information is information associated with previous blocks for which transforms were not performed.

19. The one or more non-transitory computer-readable media of claim 15, wherein the different information is different context for the entropy coding the quantized residual values for the current block.

20. The one or more non-transitory computer-readable media of claim 15, wherein the residual values are transform coefficients or the intra prediction residual information depending on whether the inverse transform is used for the current block, the residual values being the transform coefficients if the inverse transform is used for the current block, and the residual values being the intra prediction residual information if the inverse transform is skipped for the current block.

* * * * *